US007403602B2

(12) United States Patent
Khan

(10) Patent No.: US 7,403,602 B2
(45) **Date of Patent: *Jul. 22, 2008**

(54) INTERNET-BASED MESSAGE DELIVERY WITH PSTN BILLING

(75) Inventor: Azhar I. Khan, Norcross, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,332

(22) Filed: Nov. 13, 2006

(65) Prior Publication Data

US 2007/0130267 A1 Jun. 7, 2007

Related U.S. Application Data

(63) Continuation of application No. 09/929,914, filed on Aug. 15, 2001, now Pat. No. 6,529,592, and a continuation of application No. 10/347,833, filed on Jan. 21, 2003, now Pat. No. 7,136,468.

(51) Int. Cl.
*H04M 15/00* (2006.01)
*H04M 1/64* (2006.01)

(52) U.S. Cl. ............................. 379/114.01; 379/88.17; 379/100.05; 379/114.05; 379/114.28; 379/127.01

(58) Field of Classification Search ................ 379/67.1, 379/90.01, 93.01, 93.05, 100.15–16, 111, 379/114.01, 114.05, 121.01, 127.01, 88–89, 379/93.09, 115.01, 115.03
See application file for complete search history.

(56) References Cited

U.S. PATENT DOCUMENTS 5,812,639 A * 9/1998 Bartholomew et al. ...... 370/352
5,905,736 A * 5/1999 Ronen et al. ................ 370/546
5,966,663 A * 10/1999 Gleason ...................... 455/466
6,055,302 A * 4/2000 Schmersel et al. ..... 379/201.01
6,215,858 B1 * 4/2001 Bartholomew et al. ... 379/88.17
6,233,318 B1 * 5/2001 Picard et al. ............. 379/88.17
6,285,745 B1 * 9/2001 Bartholomew et al. ... 379/88.17
6,430,282 B1 * 8/2002 Bannister et al. ....... 379/211.02

* cited by examiner

*Primary Examiner*—Binh K Tieu
(74) *Attorney, Agent, or Firm*—Merchant & Gould, P.C.

(57) ABSTRACT

A global computer network message delivery service is disclosed. A sender enters a short message for delivery to a recipient's telephone. The sender also enters the recipient's telephone number. The sender may also enter the telephone number that he can be reached at in case the recipient wants to converse live with the sender upon receipt of the message. The message and other entered information is authenticated and validated. The sender's billing telephone number is determined for billing purposes. A call leg is created from a service node to the switch hosting the sender's billing telephone number. The sender's inter-exchange carrier codes are determined and another call leg is created from the service node to the recipient's telephone. After the recipient answers, the service node plays the message (via text-to-speech technology) to the recipient. The inter-exchange carrier codes are used to bill the message service to the sender's billing telephone number.

20 Claims, 4 Drawing Sheets

400
402 Start
404 Sender enters message and recipient's telephone number
406 Perform authentication and validation
408 Determine billing telephone number of sender
410 Create call leg from service node to SSP hosting sender's billing telephone number
412 Determine sender's interexchange carrier codes
414 Create call leg from sender's hosting SSP to recipient's telephone
416 Play message to recipient
418 Receive input from recipient
420 Bill sender's telephone number
499 End

INTERNET-BASED MESSAGE DELIVERY WITH PSTN BILLING

CROSS REFERENCE TO RELATED APPLICATIONS

The present application is a continuation of U.S. patent application Ser. No. 09/929,914, entitled "Internet-Based Message Delivery With PSTN Billing", filed Aug. 15, 2001 now U.S. Pat. No. 6,529,592, and U.S. patent application Ser. No. 10/347,833, entitled "Internet-Based Message Delivery With PSTN Billing", filed Jan. 21, 2003 now U.S. Pat. No. 7,136,468, which are herein incorporated by reference.

FIELD OF THE INVENTION

This invention relates to a method and system for delivery of a message via a global computer network to a receiver's telephone with billing to the sender's billing telephone number.

BACKGROUND OF THE INVENTION

Message delivery using a global computer network, such as the Internet, is well-known. For example, delivery of electronic messages, such as e-mail, is one of the most common forms of message delivery. However, other types of messages such as pages, telephone messages, facsimiles, short message service (SMS) messages, as well as other types of messages may be delivered via the Internet using a message delivery service.

To use one of these message delivery services, in most cases, a user subscribes to the service by submitting their credit card information over the Internet. After subscribing, the user enters their account information into the service's website and composes a message, such as by entering a subject line and the body of the message. The user also selects the recipients of the message and selects the delivery method(s) for the message, such as e-mail, fax, pager, etc. An exemplary Internet message delivery service is Envoy Worldwide, Inc.'s "MessageBlaster" delivery service.

Although these services work fairly well, they do have some drawbacks. For example, many users of the Internet are reluctant to transmit their credit card information over the Internet. Without submitting credit card information, it may be difficult for a user to subscribe to a message delivery service (particularly if a user wants to quickly subscribe and send a message).

SUMMARY OF THE INVENTION

In one embodiment, the invention comprises a global computer network message delivery service. A sender enters a short message for delivery to a recipient's telephone. The sender also enters the recipient's telephone number. The sender may also enter the telephone number that he can be reached at in case the recipient wants to converse live with the sender upon receipt of the message. The message and other entered information is authenticated and validated. The sender's billing telephone number is determined for billing purposes. A call leg is created from a service node to the switch hosting the sender's billing telephone number. The sender's inter-exchange carrier codes are determined and another call leg is created from that switch to the recipient's telephone. After the recipient answers, the service node plays the message (via text-to-speech technology) to the recipient. The inter-exchange carrier codes are used to bill the message service to the sender's billing telephone number.

One of the advantages of the present invention is that the service is billed to the sender's billing telephone number so that billing is simple and easy. The sender does not have to give any credit card information over the Internet. The present invention also provides an easy way of communicating without having to directly speak with someone on the telephone.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
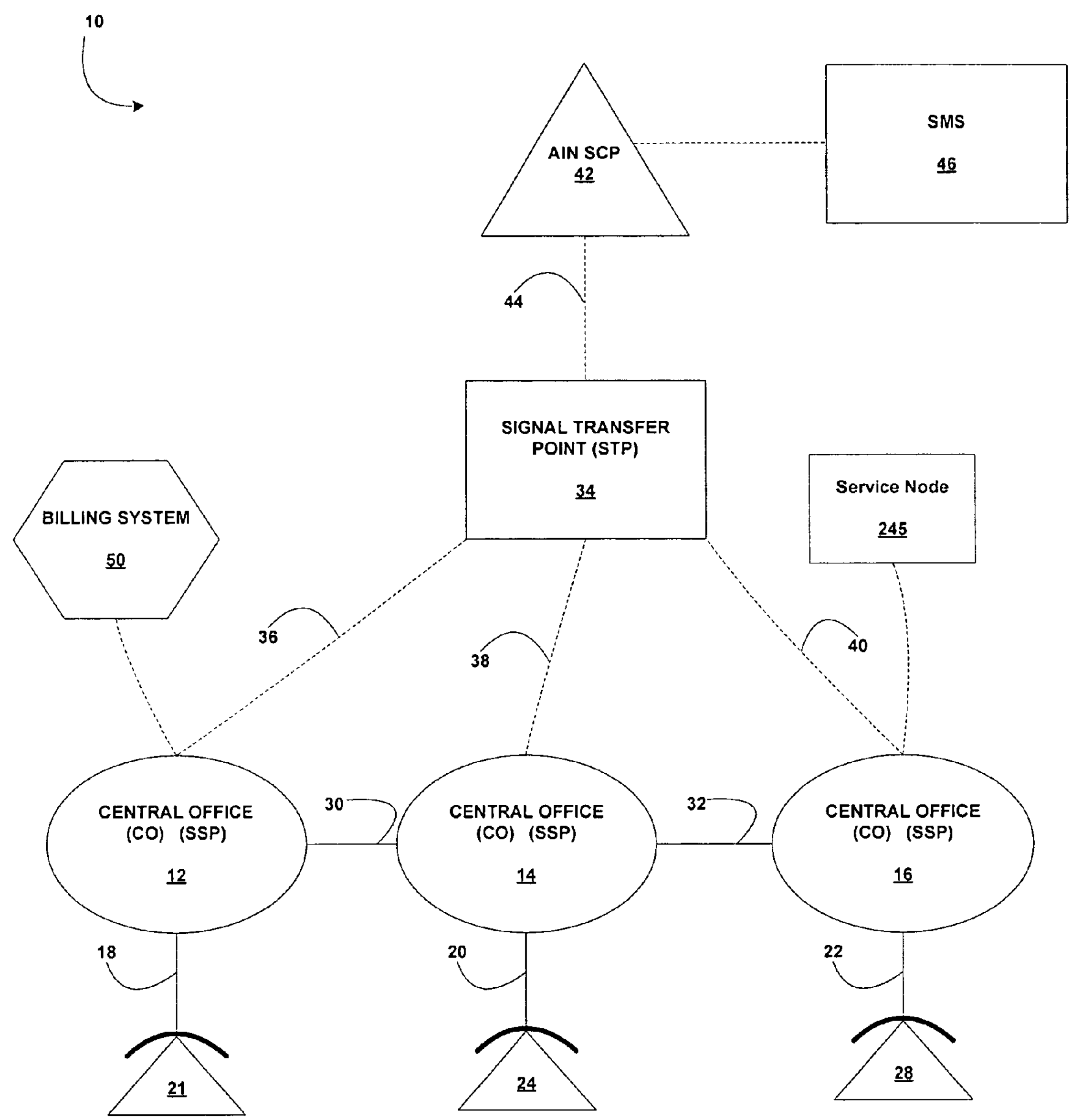
FIG. 1 is a block diagram representing at least a part of the advanced intelligent network (AIN) of a typical local exchange carrier.

The present invention, in one embodiment, is directed to a method and system for the delivery of a message (entered in text format) from a sender's computer to a recipient's telephone (where the message is delivered in audio format). The charges for the message delivery are billed to the sender's billing telephone number no matter where the sender is currently located. Thus, the sender does not have to submit any credit card information over the Internet because the billing is to the sender's billing telephone number (such as the user's home telephone number). The invention may also allow the recipient to talk with the sender or to record a response for delivery to the sender's preferred e-mail or voicemail system. This is again charged to the sender.

In one embodiment of the invention, a sender enters a short message for delivery to a recipient's telephone. The sender also enters the recipient's telephone number. The sender may also enter the telephone number that he can be reached at in case the recipient wants to converse live with the sender upon receipt of the message. The message and other entered information is authenticated and validated. The sender's billing telephone number is determined for billing purposes. A call leg is created from a service node to the switch hosting the sender's billing telephone number. The sender's inter-exchange carrier codes are determined and another call leg is created from the sender's hosting switch to the recipient's telephone. After the recipient answers, the service node plays the message (via text-to-speech technology) to the recipient. The inter-exchange carrier codes are used to bill the message service to the sender's billing telephone number.

Having briefly described an embodiment of the present invention, the advanced intelligent network (AIN) and an exemplary operation environment for the present invention are described below. Many of these AIN elements are utilized in the present invention. Embodiments of the present invention will then be described.

Referring now to the drawings, in which like numerals represent like elements throughout the several figures, aspects of the present invention and the advanced intelligent network (AIN) will be described.

The modern public switched telephone network (PSTN) has separate signaling paths for voice signals (or other customer-utilized communication circuits) and for control signals, which include information transmitted throughout the network to control the connection and disconnection of the voice circuits. In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high-speed digital data that could first determine whether a call could be completed prior to assigning trunk capacity to set up the voice link. Thus, with common channel interoffice signaling, the identity of the dialed number can be transmitted over the interoffice signaling data links from the originating central office to the terminating central office, which is the central office that services the dialed or called number. CCIS offers benefits such as speeding up the setting up and tearing down of phone calls. CCIS also allows much more information (such as the calling number, a message, etc.) to be carried about the phone call than that carried on in-band signaling.

If the dialed number is busy, data representing this information is transmitted back over the interoffice signaling link to the originating central office that locally provides an audible busy signal to the caller. Therefore, no long distance trunk capacity is occupied during this process, and the voice circuits remain free for other uses. If the dialed number is not busy, various devices in the network respond to the information about this call to assign interoffice trunks to set up a connection for the call. While the call is being set up, the originating central office, based on a signal from the terminating central office, returns an audible ring back tone (RBT) to the caller. Once the dialed number is answered, an answer signal is passed from the terminating central office to the originating central office, the ring back tone is terminated, and the call is completed.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. As shown in FIG. 1, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

The service node 245 is used to implement functions such as voice-to-text and text-to-voice conversions, among other functions. Those skilled in the art are familiar with service nodes, which may be physically implemented by the same types of computers that embody SCPs. In addition to the computing capability and data base maintenance features, service nodes use ISDN lines and may include DTMF signal recognition devices, tone generation devices, voice synthesis devices and other voice or data resources. While service nodes are physically quite similar to SCPs, there are some important differences in the uses to which they are put.

Service control points normally implement high volume routing or screening services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber. By contrast, service nodes are used principally when some custom feature or service is needed that requires an audio connection to the call or transfer of a significant amount of data to a subscriber over a switched connection during or following a call.

Additional devices for implementing advanced network functions within the AIN 10 are provided by regional STPs (not shown), regional AIN SCPs (not shown), and a service management system (SMS) 46. The STP 34 is connected to the SSPs via connections 36, 38 and 40. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and inter-exchange carriers. SSPs download, on a non-real time basis, billing information to a billing system 50 that is needed in order to appropriately invoice subscribers for the services provided.

For preparation of billing information, the subscriber's pre-subscribed telecommunications service provider is generally responsible for maintaining records for both local and long distance services and producing billing statements for individual subscribers. The billing system 50 produces these billing statements, which are typically mailed to subscribers on a periodic basis. Information may be downloaded from the SSP 12 to the billing system 50 in association with the preparation of the billing statements. As is well-known to those skilled in the art, the billing system 50 includes large general purpose computing devices which can accumulate billing information and produce desired accounting records. The operation of a billing system of a telecommunications service provider, such as the billing system 50, is well-known to those skilled in the art.

It will be appreciated that the billing system 50 may prepare records for each subscriber on a per-communication basis. These per-communication records for a particular subscriber are typically created by the originating switch that services the subscriber's line. Preferably, the AIN central office switches, such as SSP 12, create call records which contain AIN Automatic Message Accounting (AIN AMA) records and call disposition information (e.g. answered, busy, etc.). The AIN AMA record is the message accounting protocol currently implemented in the AIN and is well-known to those skilled in the art.

For each AIN communication, an AIN AMA record is created preferably which contains the originating number, the terminating number, and the connection duration. The per-communication records created by the SSP 12 for the subscriber line 18 are periodically downloaded to the billing system 50 on a non-real time basis. The billing system 50 computes the costs for the communications represented by the various records and prepares billing statements to be mailed to the subscriber.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are wellknown to those skilled in the art and will not be further described herein. For more information regarding the AIN protocol, see Bellcore Specification GR-1298-CORE Switching Systems Generic Requirements for AIN 0.1, which is incorporated herein by reference.

Having described an exemplary AIN environment in reference to FIG. 1, an exemplary operating environment for the present invention will be described in reference to FIGS. 2 and 3. The exemplary operating environment incorporates many of the AIN elements described above in reference to FIG. 1.

Figure 2:
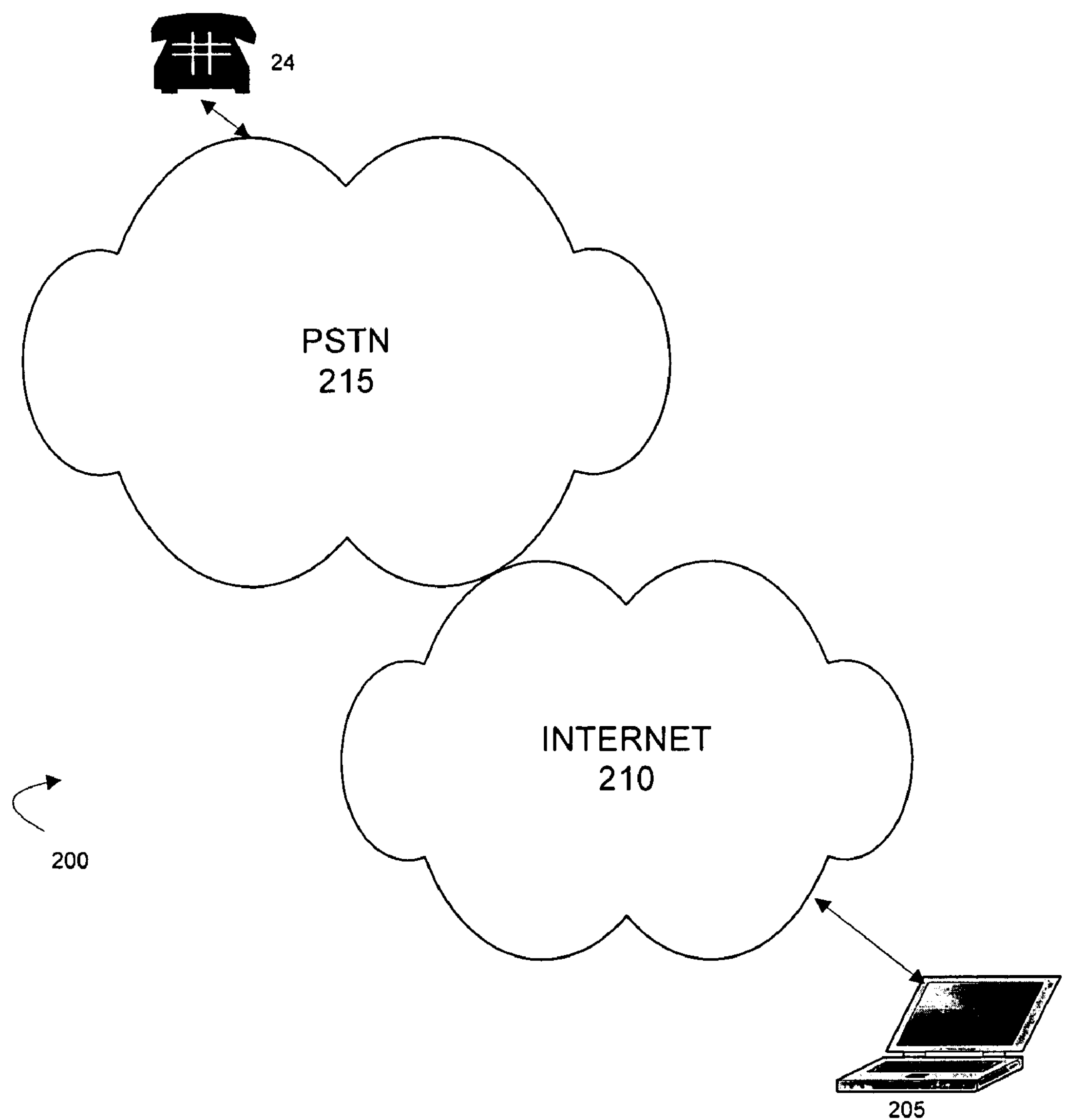
FIGS. 2 and 3 are diagrams illustrating an exemplary operating environment for an embodiment of the present invention.

The exemplary operating environment 200 illustrated in FIG. 2 comprises a computing device 205 connected to a global computer network such as the Internet 210. The Internet is connected to a public switched telephone network (PSTN) 215 and a telephone set 24. The PSTN 215 comprises many of the AIN elements described above in reference to FIG. 1 for routing and connecting telephone calls and providing enhanced features.

Under direction of the present invention, a sender uses the computing device 205 to enter and deliver a text-based message from the computing device 205 to a recipient's telephone set 24. The text-based message is preferably delivered in audio format over the telephone set 24. The charge for the message delivery is billed to the sender's billing telephone number.

Figure 3:
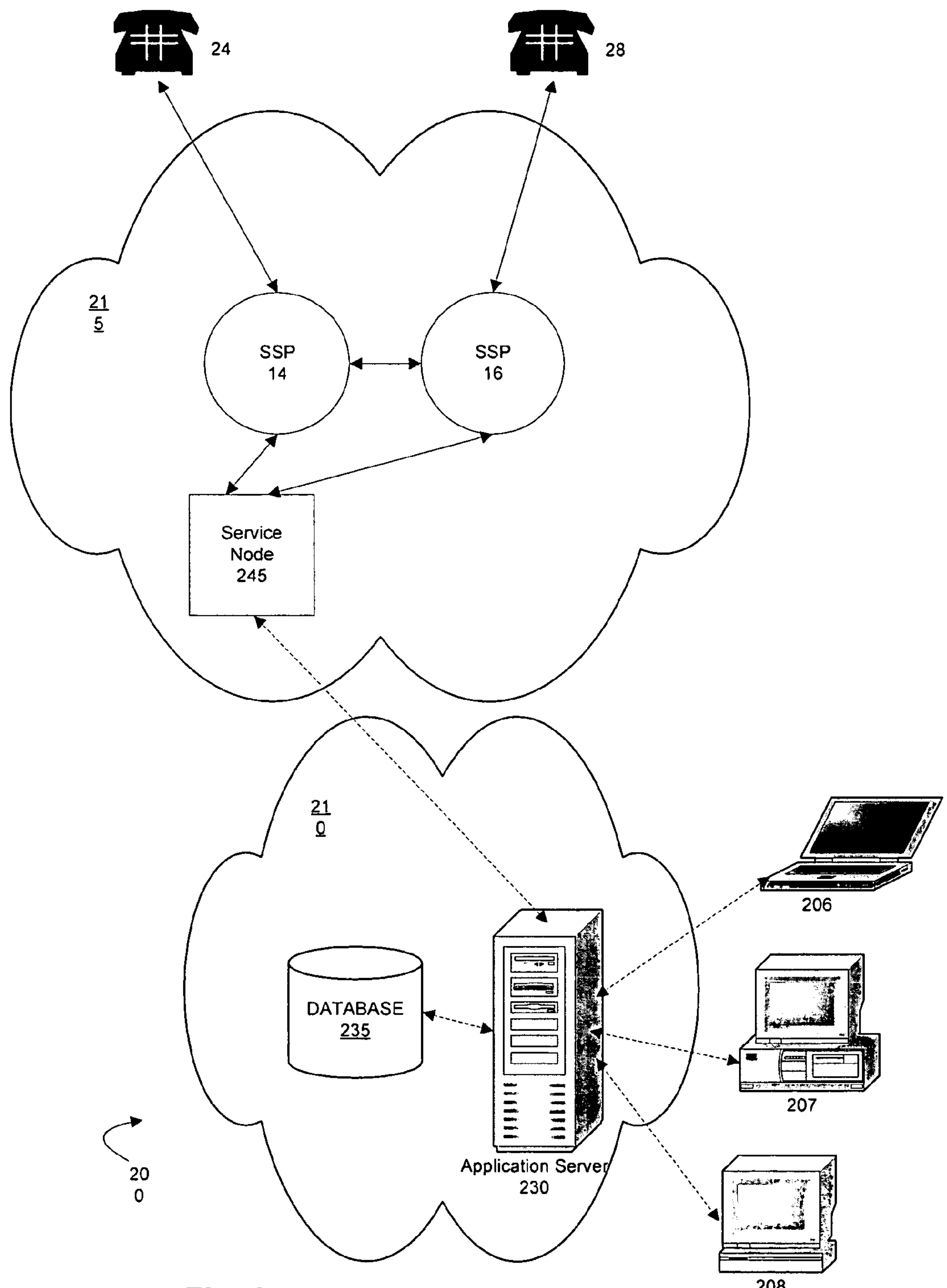

Referring now to FIG. 3, a detailed diagram illustrating the exemplary operating environment 200 for an embodiment of the present invention will be described. To use the message service described by the present invention, the sender uses an input method of a computing device to enter a message. In a preferred embodiment, the message is a text-based message entered via a keyboard on a computer. However, different types of input methods may also be used. For example, the input method may be a keypad, a voice recognition engine, a handwriting recognition engine, or the like. The sender may also use different types of computing devices. For example, the computing device may be a portable laptop computer 206, a desktop computer 207, a workstation 208, a pager (not shown), a personal digital assistant (PDA) (not shown), a wireless phone (not shown), or some other computing device with Internet access.

The computing devices are connected to a global computer network such as the Internet 210. The message travels over the global computer network to the public switched telephone network (PSTN) 215. The PSTN 215 then uses text-to-speech technology to convert the text message into audio format and deliver the audio message to the recipient's telephone set 24.

Figure 4:
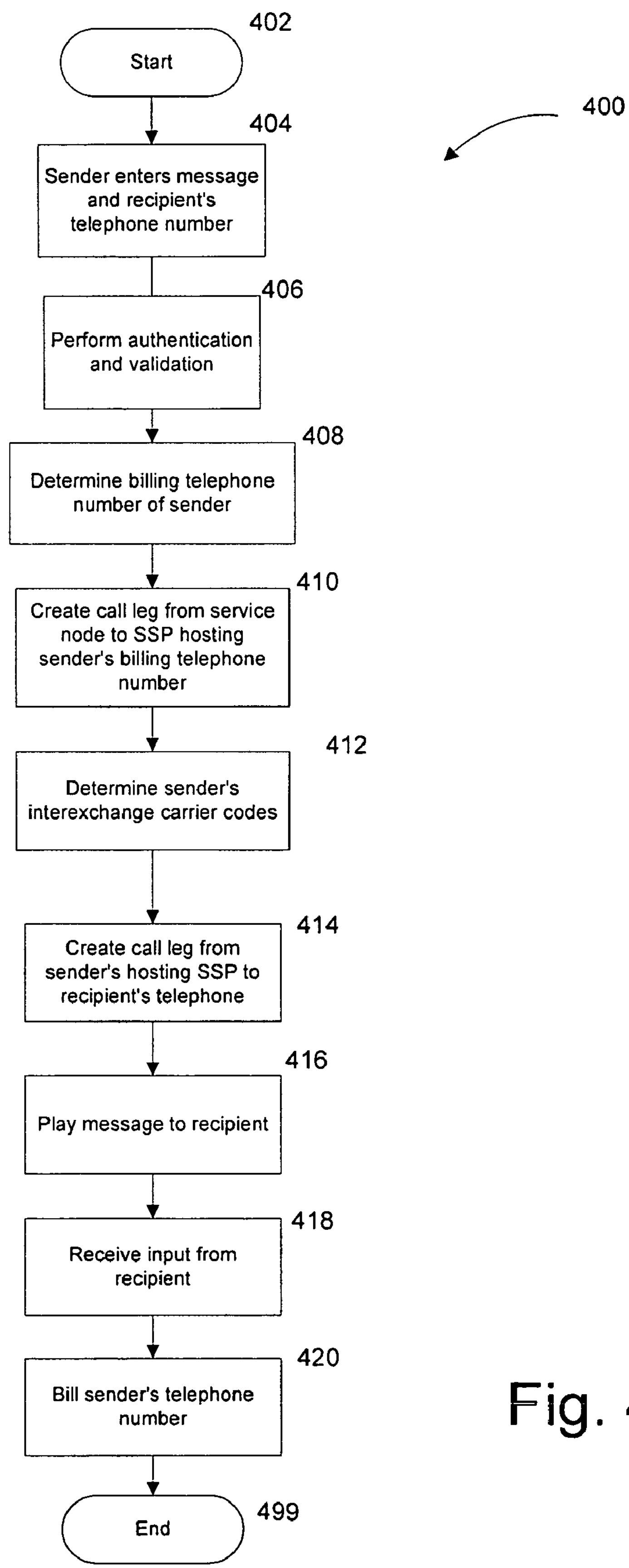
FIG. 4 is a flow diagram illustrating a method for message delivery from a sender's computer to a recipient's telephone in accordance with an embodiment of the present invention.

To implement the present invention, a software application program module (not shown) to control the message service may be hosted on a network platform, such as an application server 230. Another software application program module is also hosted on a service node 245 as part of the PSTN 215. Those skilled in the art will appreciate that the steps described in the flow diagram of FIG. 4 are executed in response to instructions that have been incorporated into the software application program module.

Thus, the computing device sends the message to the application server 230. The application server may be connected to a database 235 which includes subscriber information regarding the sender of the message. The database 235 may contain information about the subscriber such as password, billing telephone number, sender's credit standing, credits remaining (if this is a metered service), etc.

The application server is able to communicate with the PSTN 215, in particular, with the service node 245. After authentication, the application server sends a message to the service node 245 via TCP/IP protocol with the message text, sender's billing telephone number, and other relevant information.

Still referring to FIG. 3, the exemplary operating environment 200 also includes a sender's billing telephone number associated with a sender's telephone set 28. The sender's billing telephone number is used for billing the charges for the message delivery service as will be described below in reference to FIG. 4.

Having described an exemplary operating environment 200 in reference to FIGS. 2 and 3, a flow diagram 400 illustrating a method 400 for delivering a text-based message from a computer to a telephone in accordance with an embodiment of the present invention will be described below in reference to FIG. 4.

The method 400 begins at start step 402 and proceeds to step 404 where a user (the sender) enters a text message and a recipient's telephone number. Typically, the sender navigates a web browser of a computing device to a website operated by a service provider operating the message service. The first time a sender uses the service, the sender may be asked to submit information verifying the user's billing telephone number and the user may be assigned a user identification and a password. On subsequent visits to the website, the sender may be asked to enter the user identification and the password to verify that the user subscribes to the service. The sender may also be asked to enter the sender's billing telephone number on each subsequent visit to the website (or this information may be stored by the message delivery service). In different embodiments of the invention, the message delivery service may be billed to the sender on a per-use basis or based on a monthly fee. In a preferred embodiment, the message delivery service is billed to the sender's home telephone number although the service may be billed to another billing telephone number designated by the sender.

In other embodiments of the invention, the sender may enter a telephone number where the sender may be reached in case the recipient of the message wants to call back the sender.

After the sender has entered the information at step 404, the sender's user identification and password are authenticated and validated at step 406. For example, the user identification and password may be authenticated to ensure that they match a user ID/password in the database 235. The user identification and password may also be validated to ensure that the sender is a customer in good standing with an acceptable payment history.

At step 408, the billing telephone number of the sender is determined. Normally, the sender's billing telephone number is the sender's home telephone number. This information may be stored in association with the sender's account information. In one embodiment, the sender's billing telephone number is stored in database 235 (FIG. 3) and is retrieved from the database at step 408. The sender's billing telephone number may also be entered by the user when he enters the message.

At step 410, a call leg is created from a service node 245 to a service switching point 16 hosting the sender's billing telephone number. Thus, at step 410, the service switching point (SSP) 16 serving the sender's billing telephone number is determined, the service node 245 connected to the SSP is determined and a call leg is established between the service node and the SSP.

At step 412, the interexchange carrier (IEC) codes (for both inter-LATA and intra-LATA tolls) associated with the sender's billing telephone number are determined. An IEC is a common carrier authorized by the FCC to carry customer transmissions from local access and transport areas (LATAs). In one embodiment, the interexchange carrier codes are determined from the sender's preferred interexchange carriers (IECs) provisioned on the billing telephone line. Thus, the SSP 16 is able to use the billing telephone number to determine the IEC codes. The IEC codes are used for billing purposes. Typically, the call is routed from the service node to the SSP 16 serving the sender's line at which the IEC codes are picked up. At step 414, another call leg is established from the SSP 16 to the recipient's line (using the IEC codes to route this call leg over the appropriate local and long distance carriers from sender's SSP to recipient's SSP).

At step 416, after the recipient answers the telephone, an audio message is played to the recipient. It should be understood that the service node includes text-to-speech engines and is able to convert the text message to an audio message that is played to the recipient.

At step 418, it is determined whether any input is received from the recipient. In some embodiments of the invention, options are provided to the recipient to either talk with the sender live or record a response which may then be delivered to the sender's preferred e-mail/voicemail system.

For example, in one embodiment, the present invention provides the following audio options to the recipient:

"Press 1 to indicate receipt of the message and terminate the call";

"Press 2 to record and deliver a response to the message"; or

"Press 3 to talk with the sender."

If the recipient enters "1" through the telephone keypad telephone set 24, the call is terminated and receipt notification is sent to the sender. If the recipient enters "2", the present invention allows the recording of a voice message. Once complete, the invention delivers the response to the sender at their favorite (predefined) e-mail/voicemail/unified mail system. If the recipient enters "3", the service node creates a call between the receiver's telephone set 24 and the sender's directory number entered by the sender at step 404. After the sender and receiver converse, the connection is dropped and this call is also billed to the sender.

Thus, at step 418, input is received from the recipient and appropriate actions are performed based on this input.

At step 420, the sender's billing telephone number is billed for all calls made during the method 400. The sender is also billed for any return calls made by the recipient to the sender such as when the recipient chooses the option to speak directly with the sender. These billing issues will normally be handled by billing system 50 of the AIN.

One of the advantages of the present invention is that the service is billed to the sender's billing telephone number (normally the sender's home telephone number) so that billing is simple and easy. The sender also does not have to give any credit card information over the Internet which many customers are hesitant to provide. The present invention also provides an easy way of communicating without having to directly speak with someone on the telephone. The present invention also provides a cheap and easy way to send a short message to a recipient. For example, a sender traveling in Europe may connect to the Internet and send a message to a recipient in Atlanta and, if their billing telephone number is in a local calling area with respect to the recipient in Atlanta the sender will only be billed for the service and for the local phone call.

Although the present invention has been described above as implemented in a preferred embodiment, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for sending a message to a recipient's telephone over a computer network, the method comprising:
- receiving the message and a directory number associated with a recipient's telephone, over a computer network;
- receiving a billing directory number associated with a sender of the message;
- creating a call assigned to the billing directory number to the recipient's directory number;
- determining if the recipient's telephone is answered;
- if the recipient's telephone is answered, receiving input from the recipient, wherein the recipient indicates how to respond to the received message; and
- forwarding information associated with the answered telephone call for use in charging one of the billing directory number and a billing telephone number designated by a user for fees associated with the call, wherein the sender is charged for calls to the recipient and from the recipient if the input from the recipient indicates a desire to talk to the sender based on the received message.

2. The method of claim 1, wherein creating a call assigned to the billing directory number to the recipient's directory number comprises:
- creating a call from the service node to a service switching point (SSP) in a telecommunications network hosting the billing directory number; and
- creating a call from the SSP hosting the billing directory number to the recipient's directory number.

3. The method of claim 1, wherein the message is a text message.

4. The method of claim 3, further comprising:
- determining at least one inter-exchange (IEC) carrier code associated with the billing directory number;
- converting the text message to an audio message; and
- playing the audio message over the recipient's telephone.

5. The method of claim 4, further comprising:
- receiving a user identification and a password; and
- validating the user identification and password before performing the steps of the method.

6. The method of claim 4, wherein charging the billing directory number for fees associated with the call comprises:
- determining the duration of the call assigned to the billing directory number to the recipient's directory number; and
- creating a call record for the call assigned to the billing directory number to the recipient's directory number.

7. The method of claim 6, wherein the call record establishes that the at least one carrier identified by the at least one inter-exchange (IEC) carrier code should receive payment for the call from the service node assigned to the billing directory number to the recipient's directory number.

8. The method of claim 7, wherein the telecommunications network is an advanced intelligent network (AIN) wireline network.

9. The method of claim 8, wherein the call record is an AIN AMA record.

10. The method of claim 1 further comprising providing a plurality options to the recipient for responding to the received message.

11. A computer-readable medium which stores a set of instructions which when executed perform a method for sending a message to a recipient's telephone over a computer network, the method executed by the set of instructions comprising:
- receiving the message and a directory number associated with a recipient's telephone, over a computer network;
- receiving a billing directory number associated with a sender of the message;
- creating a call assigned to the billing directory number to the recipient's directory number;
- determining if the recipient's telephone is answered;
- if the recipient's telephone is answered, receiving input from the recipient, wherein the recipient indicates how to respond to the received message; and
- forwarding information associated with the answered telephone call for use in charging one of the billing directory number and a billing telephone number designated by a user for fees associated with the call, wherein the sender is charged for calls to the recipient and from the recipient if the input from the recipient indicates a desire to talk to the sender based on the received message.

12. The computer-readable medium of claim 11, wherein creating a call assigned to the billing directory number to the recipient's directory number comprises:
- creating a call from the service node to a service switching point (SSP) in a telecommunications network hosting the billing directory number; and
- creating a call from the SSP hosting the billing directory number to the recipient's directory number.

13. The computer-readable medium of claim 11, wherein the message is a text message.

14. The computer-readable medium of claim 13, further comprising:
- determining at least one inter-exchange (IEC) carrier code associated with the billing directory number;
- converting the text message to an audio message; and
- playing the audio message over the recipient's telephone.

15. The computer-readable medium of claim 14, further comprising:
- receiving a user identification and a password; and
- validating the user identification and password before performing the steps of the method.

16. The computer-readable medium of claim 14, wherein charging the billing directory number for fees associated with the call comprises:
- determining the duration of the call assigned to the billing directory number to the recipient's directory number; and
- creating a call record for the call assigned to the billing directory number to the recipient's directory number.

17. The computer-readable medium of claim 16, wherein the call record establishes that the at least one carrier identified by the at least one inter-exchange (IEC) carrier code should receive payment for the call from the service node assigned to the billing directory number to the recipient's directory number.

18. The computer-readable medium of claim 17, wherein the telecommunications network is an advanced intelligent network (AIN) wireline network.

19. The computer-readable medium of claim 18, wherein the call record is an AIN AMA record.

20. A system for sending a message to a recipient's telephone over a computer network, the method comprising:

means for receiving the message and a directory number associated with a recipient's telephone, over a computer network;

means for receiving a billing directory number associated with a sender of the message;

means for creating a call assigned to the billing directory number to the recipient's directory number;

means for determining if the recipient's telephone is answered;

if the recipient's telephone is answered, means for receiving input from the recipient, wherein the recipient indicates how to respond to the received message; and means for forwarding information associated with the answered telephone call for use in charging one of the billing directory number and a billing telephone number designated by a user for fees associated with the call, wherein the sender is charged for calls to the recipient and from the recipient if the input from the recipient indicates a desire to talk to the sender based on the received message.

* * * * *